US 6,718,364 B2

(12) United States Patent
Connelly et al.

(10) Patent No.: US 6,718,364 B2
(45) Date of Patent: *Apr. 6, 2004

(54) METHOD AND APPARATUS FOR EXPEDITED FILE DOWNLOADS IN AN APPLET ENVIRONMENT

(75) Inventors: David Connelly, San Francisco, CA (US); Zhenghua Li, San Jose, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,437

(22) Filed: Aug. 10, 1999

(65) Prior Publication Data

US 2003/0105888 A1 Jun. 5, 2003

(51) Int. Cl.[7] ..................... G06F 15/16; G06F 15/173
(52) U.S. Cl. .................................. 709/203; 709/226
(58) Field of Search ........................... 709/203, 236, 709/107; 707/103, 204, 226, 223, 232

(56) References Cited

U.S. PATENT DOCUMENTS 5,937,411 A * 8/1999 Becker ..................... 707/100
6,023,710 A * 2/2000 Steiner et al. .............. 707/204
6,286,051 B1 * 9/2001 Becker et al. .............. 709/236
6,405,246 B1 * 6/2002 Hutchison .................. 709/203

FOREIGN PATENT DOCUMENTS

EP            0817031            7/1998

OTHER PUBLICATIONS

"Java Threads" O'Relly Publishing, 1997. Retrieved from: http://www.oreilly.com/catalog/jthreads/excerpt/ch01.html.*
R. Pesch, "The GNU Binary Utilities", Online!, May 1993.
"Cygnus Support: Unix Man Pages", Online!, Nov. 5, 1991.

* cited by examiner

Primary Examiner—Zarni Maung
(74) Attorney, Agent, or Firm—Beyer Weaver and Thomas LLP (57) ABSTRACT

Methods and apparatus for executing an applet are disclosed. A virtual machine that includes a class loader generates a file download request in the form of an http request to a particular server computer that contains appropriate applet component files. The class loader queries a root JAR file having an index file associated with applet. The class loader creates a HASH table based upon the contents of the index file that provides a mapping of all packages and all corresponding JAR files required to execute the applet by the virtual machine. During virtual machine runtime the class loader queries the HASH table in order to directly access the appropriate applet component file to be downloaded and executed by the virtual machine.

20 Claims, 7 Drawing Sheets

METHOD AND APPARATUS FOR EXPEDITED FILE DOWNLOADS IN AN APPLET ENVIRONMENT

BACKGROUND OF THE INVENTION

1. Field of Invention

The invention relates generally to computer systems. More particularly, methods and apparatus for providing on-demand network application download and execution capabilities in a distributed computer network are disclosed.

2. Description of Relevant Art

Generally speaking, a browser is an application program that provides a way to look at and interact with all the information on the distributed computer networks such as the Internet. In particular, a Web browser is a client program that uses the Hypertext Transfer Protocol (HTTP) to make requests of Web servers throughout the Internet on behalf of the browser user. Java™, a programming language developed by Sun Microsystems Inc. of Mountain View Calif., is expressly designed for use in the distributed environment of the Internet. It was designed to have the "look and feel" of the C++ language, but it is simpler to use than C++ and enforces a completely object-oriented view of programming. In this way, Java is used to create complete applications that can run on a single computer or be distributed among servers and clients in a network.

Figure 1:
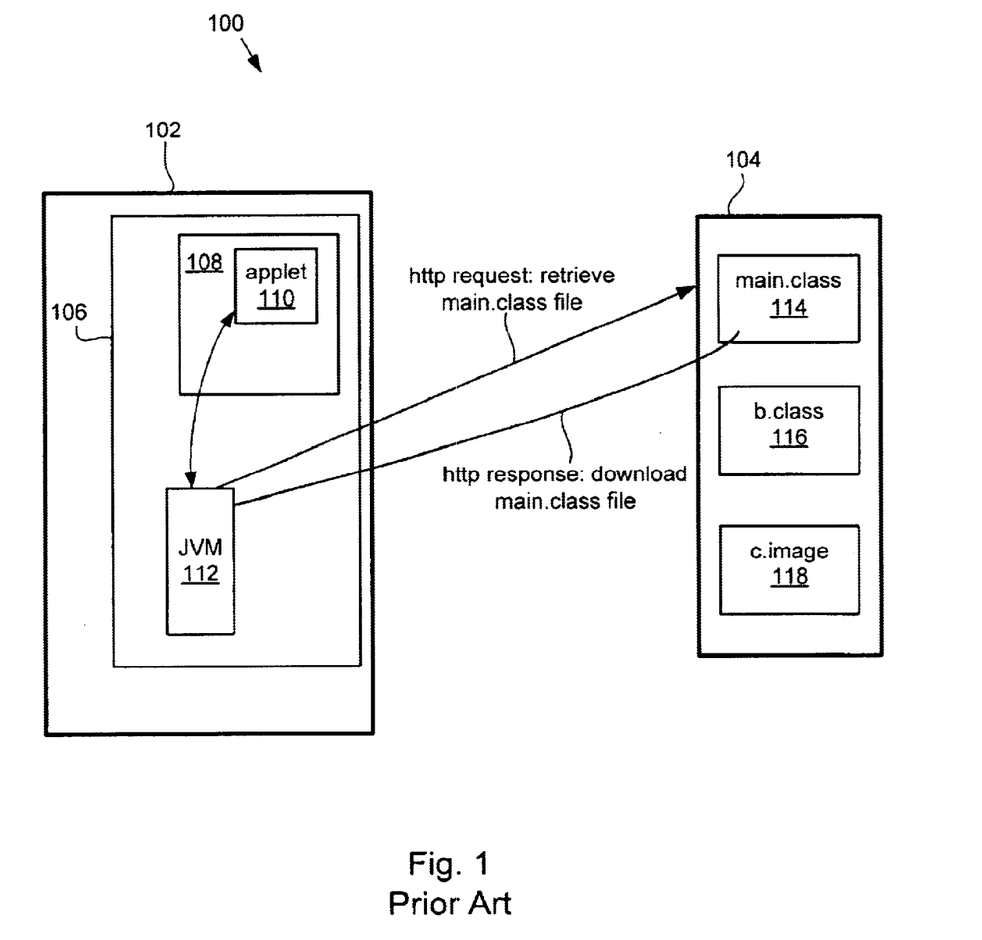
FIG. 1 shows a conventional distributed computer system capable of supporting a Java based browser/server configuration.

One of the many advantages of Java is that it can also be used to build small application modules, or applets, for use as part of a Web page. A Java applet is a small program that can be sent along with a Web page to a user that can perform interactive animations, immediate calculations, or other simple tasks without having to send a user request back to the server. As an example, as shown in FIG. 1, a distributed computer system 100 includes a client computer 102 that is coupled to a server (host) computer 104. The computer 102 includes a browser application 106 that, in turn, includes a requested Web page 108 having an applet 110 embedded therein capable of performing various tasks. In most situations, the applet 110 is executed by a Java Virtual Machine (JVM) 112 that in this example is also resident in the browser 106.

In order for the JVM 112 to execute the applet 110, the applet's requisite component files (such as ".class files", images and sounds) represented by files 114–118 must be downloaded from the server 104 to the JVM 112. Typically the server 104 is part of a distributed network of computers, such as the Internet, or in some cases could be part of an intranet type of arrangement. In any case, the files 114–118 that are required for the JVM 112 to run the applet 110 include Java class files as well as resource files that are used to support the execution of the applet 110. Such class files, includes a main class file, main.class 114, that is used by the JVM 112 as an entry point for execution of the applet 110. The server 104 also stores other class files such as b.class 116 that are used by the JVM 112 in the furtherance of executing the applet 110. Various image and sound components used in the execution of the applet 110 are stored in resource files such as c.image 118.

In order for the JVM 112 to execute the applet 110, it may be required to download some of the class and resource files as needed. This is typically accomplished by sending a file request that takes the form of an http request to the server 104 which responds by providing an http response that includes the URL of the requested file. By way of example, the JVM 112 issues a request to retrieve the main class file main.class 114 to which the server 104 responds by sending (i.e., downloading) the requested file (i.e., main.class 114). This request/response procedure is followed for every file for which the JVM 112 requires to execute the applet 110.

This arrangement, though inefficient, is satisfactory for executing most small applets on small, local networks. However as the complexity of the applet increases (thereby increasing both the size and the number of requested files), the performance of the JVM 112 is substantially degraded since the time required to satisfy the increasingly voluminous requests for the increasingly larger files in an increasingly more complex network of computers becomes excessive.

Figure 2:
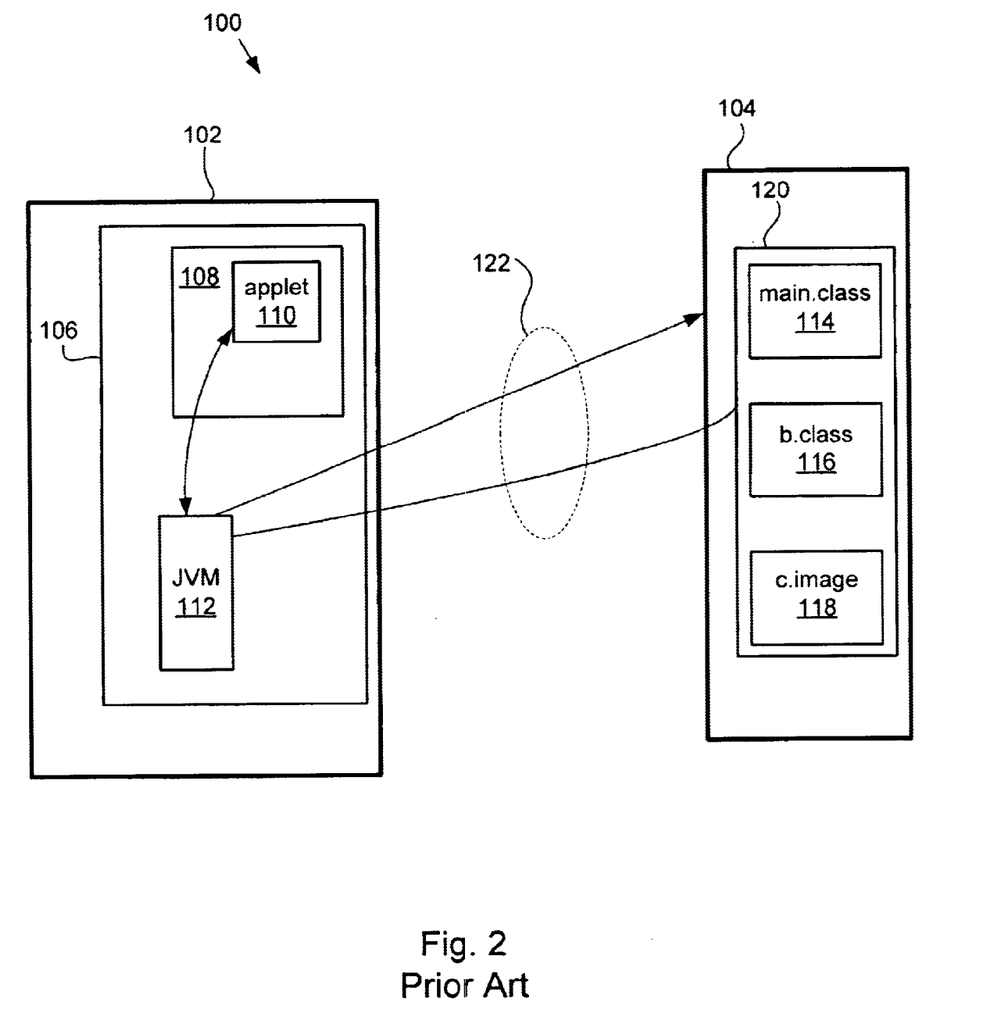
FIG. 2 shows the distributed computer system of FIG. 1 where the various applet components are stored in a single JAR file.

With the introduction of what is referred to as a Java Archive (JAR) file, the performance of network Java applications, such as applets, is somewhat improved. A JAR (Java Archive) file has a platform-independent file format that aggregates many files into one. In those applications using JAR files, multiple Java applets and their requisite components (.class files, images and sounds, etc.) can be bundled in a JAR file and subsequently downloaded to a browser in a single HTTP transaction thereby greatly improving the download speed. In addition, the JAR format also supports compression, which reduces the file size, further improving the download time. For example, referring to FIG. 2, the applet component files 114–118 are stored in a single JAR file 120. Using this arrangement, in order for the JVM 112 to execute the applet 110, only a single HTTP file request 122 is required to download the compressed JAR file 120 that contains all the applet component files 114–118.

When an applet includes multiple JAR files, a class loader will construct an internal search path of JAR files and whenever it tries to load a class or resource file, it would linearly search each JAR file on its search path in the process downloading and opening each of them. If the class loader tries to find a resource file that does not exist at all, then all the JAR files will be downloaded, even if most of them are not needed for the applet to run.

Therefore, what is desired are a method and an apparatus for providing efficient on-demand downloading of files in a distributed network environment.

SUMMARY OF THE INVENTION

In one embodiment of the present invention, a method for executing an applet is disclosed. A file download request for a root file is provided to a particular server computer by a virtual machine that is used to execute the applet. The requested root file includes applet component files used by the virtual machine to execute the applet such that related ones of the component files are grouped into a corresponding package. The root file includes an index file that contains information that relates the mapping of the package to corresponding related applet component files. A HASH table based upon the contents of the index file is then created that provides a mapping of all packages and all corresponding component files that are used by the virtual machine to execute the applet. During virtual machine runtime, the HASH table is queried for a location of a particular applet component file after which the particular applet component file is directly downloaded to the virtual machine.

In another embodiment of the invention, an apparatus for executing an applet embedded in a browser is described. The apparatus includes a means for providing a file download request for a root file to a particular server computer by a virtual machine that is used to execute the applet that includes applet component files. Related ones of the component files are grouped into a corresponding package. The apparatus also includes a means for determining if the root file includes an index file that contains information that relates the mapping of the package to corresponding related applet component files and a means for creating a HASH table based upon the contents of the index file that provides a mapping of all packages and all corresponding component files that are used by the virtual machine to execute the applet. The apparatus also includes a means for querying the HASH table for a location of a particular applet component file during virtual machine runtime as well as a means for directly downloading the particular applet component file based upon the location provided by the HASH table to the virtual machine.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In the following description, frameworks and methods of providing on-demand file downloading and execution of files within, for example, a browser/server environment are described. Although, the invention will initially be described in terms of a Java based application and/or applet residing in a multithreaded, object oriented computing system, it should be noted that the present invention can be used in any system that is capable of handling http requests and responses.

In general, when a user desires to run an applet embedded in a Java based browser, a Java virtual machine (JVM) that includes a class loader generates a file download request in the form of an http request to a particular server computer that contains the appropriate applet component files. Typically, the component files include a main class file used as an entry point for execution of the applet as well as other Java class files used in furtherance of the execution of the applet. In addition, the component files may include image and sound files, referred to more generally as resource files that provide a user interface for the applet. In a preferred embodiment, related component files are grouped in what is referred to as a package. The package, in turn, is typically compressed and stored in corresponding JAR files within, or coupled to, the server computer. In some cases, multiple packages are stored within a single Java Archive (JAR) file and in other cases, single class files (with no accompanying package) are stored in an appropriately compressed state, if so desired, in a corresponding JAR file. In some cases, a package can be stored amongst more than one JAR file.

In one embodiment of the invention, a first JAR file, referred to as the root JAR file, is associated with an index file that contains information that relates to the mapping of various packages (or individual class files) and their corresponding JAR files. In order to execute the applet, a class loader associated with the Java virtual machine queries the root JAR file and determines whether or not a corresponding index file is present. If an index file is present, the class loader creates a HASH table that is based upon the contents of the index file. In a preferred embodiment, the HASH table index provides a mapping of all packages and all corresponding JAR files required to execute the applet by the JVM. During runtime, when a particular file is required by the JVM, the class loader queries the HASH table in order to directly access the appropriate JAR file to be downloaded. In this way, the need to perform a linear search of all JAR files and component files contained therein is substantially avoided.

By reducing, or eliminating the linear searching of all component files during runtime, the amount of time and network resources required to execute a given applet is substantially reduced. In this way, it becomes economically feasible to execute and thereby apply more complex applets and/or applications than is currently possible. This increase in on-demand file downloading and the resultant improvement JVM runtime performance provides greater flexibility in providing complex on-line services related to, for example, interactive stock trading, on-line bidding and many other e-commerce transactions that require intensive real time computing capabilities.

The invention will now be described in terms of a Java Virtual Machine embedded within, or coupled to, a Java based browser resident in a client computer that is typically used to execute a applet. The applet, in turn, has a number of associated component files, such as class and image files, stored in, or coupled to, a server (host) that is connected to the client computer. In most cases, the server is coupled to other interconnected computers to form a distributed computer system such as represented by the Internet. It should be noted, however, that the invention can be implemented in any system where providing resource efficient on-demand download and execution of files used to, for example, run embedded, or other type, applications is important.

Figure 3:
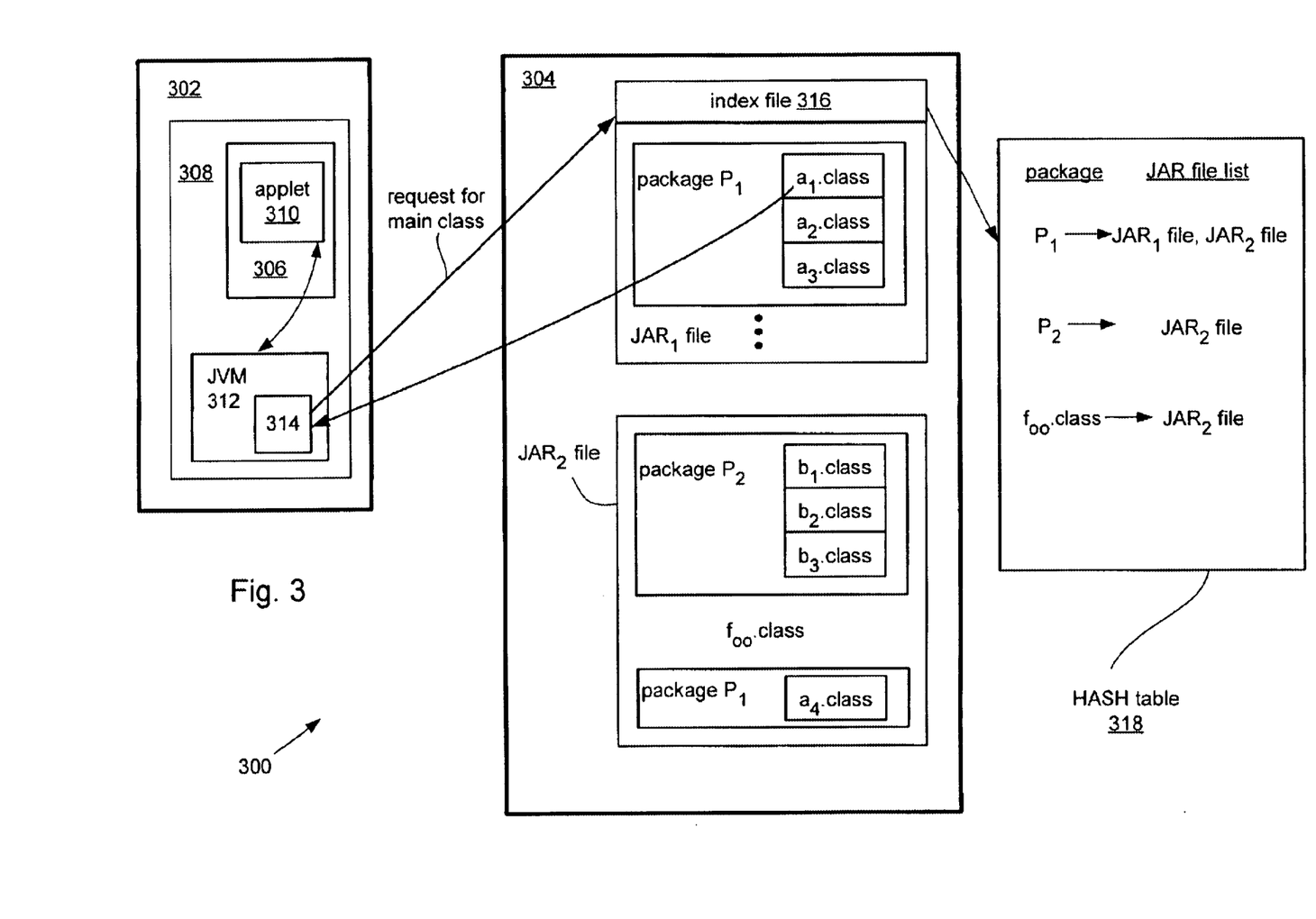
FIG. 3 shows a distributed computer system arranged to support a Java based browser/server arrangement in accordance with an embodiment of the invention.

Referring now to FIG. 3, a Java based browser/server system 300 in accordance with an embodiment of the invention is shown. The system 300 includes a client computer 302 coupled to a server (host) computer 304. Typically, the host computer 304 is part of a distributed interconnected computer network (not shown) such as the Internet, but can also be part of a local area network, sometimes referred to as an intranet. In order to facilitate communication between the various users and/or computers that form the network, the client computer 302 utilizes the graphical user interfaces presented by a Web page 306 resident in a Java based browser 308 (sometimes referred to as an http page). Most browsers are formed of various HTTP statements. In some cases, an applet 310 is formed by selectively embedding certain HTTP statements within the HTTP framework of the web page 306. By embedding various applets within the browser, the browser user can independently run various applications from a single browser thereby facilitating various interactive events between the browser user and the computer network.

In the described embodiment, a Java Virtual Machine (JVM) 312 described in detail with reference to FIG. 5, executes the applet 310 in the described embodiment by instantiating a class loader 314. The class loader 314 has the responsibility to retrieve files as directed by the JVM 312 in the execution of the applet 310. In order to execute the applet 310, however, various component files stored in the server 304 must be identified by JVM 312, retrieved by the class loader 314 and ultimately downloaded to the JVM 312 for execution. In the embodiment shown in FIG. 3, the component files corresponding to the applet are stored in various JAR files. It should be noted that in order to properly execute the applet 310, Java class files as well as resource files, such as image and/or sound files may be required. In a preferred embodiment, the various related component files are grouped into what is referred to as packages. By way of example, a package $P_1$ contains various class files, file 1.class, file 2.class, and file 3.class, such that the file 1.class (commonly referred to as a main class file) provides an entry point for the JVM 312 to start executing the applet 310. Typically, the main class is the first application class loaded by the JVM 312 which when executed by the JVM 312 will invoke additional class loading.

Continuing the description of the system 300 of FIG. 3, a package $P_2$ stored in JAR file $JAR_2$, includes various additional class files, file 10.class, file 11.class, and 12. class, used in one form or another in the execution of the applet 310. An important aspect to note is that in some cases, a single class file, such as $f_{00}$.class, may not be associated with any particular package. By way of example, the file $f_{00}$.class is not associated with any particular package but is also stored in JAR file $JAR_2$.

It is also significant to note that in some cases a package can be stored in more than one JAR file such that a particular package can be associated with a list of JAR files. Such a situation is shown in FIG. 3 with respect to package $P_1$ being stored in both JAR file $JAR_1$ and JAR file $JAR_2$.

When the JVM 312 begins to execute the applet 310, the class loader 314 associated with the JVM 312 loads the root JAR file, which in this example, is JAR file $JAR_1$. The class loader 314 will then determine if an index file 316 that maps all packages to corresponding JAR files is included in the root JAR file $JAR_1$. If there exists such an index file, the class loader 314 uses information contained in the index file 316 to create a HASH table 318. In a preferred embodiment, the HASH table 318 provides a mapping between all packages associated with the applet 310 and the corresponding JAR files in which those packages can be found. Once the HASH table 318 has been created, the class loader 314 then reads the HASH table 318 to ascertain the JAR file in which the main class file is located ($JAR_1$).

Once the main class file has been located, the class loader 314 directly downloads the appropriate JAR file as indicated by the HASH table 318 and accesses the desired main class file which is then loaded to the JVM 312. Once the JVM 312 has retrieved the downloaded main class file, the JVM 312 begins execution of the applet 310. While the JVM 312 is executing the applet 310, the class loader 314 continues to query the HASH table index 318 for the location of class and/or resource files as requested by the JVM 312 in order to continue executing the applet 310. In this way, the need to perform linear searching of the class and resource files stored within the various JAR files stored in the host computer 304 is substantially reduced, or in some cases, eliminated. Eventually, execution of the applet 310 ceases. It should be noted that the JVM 312 can execute multiple applets.

Figure 4A:
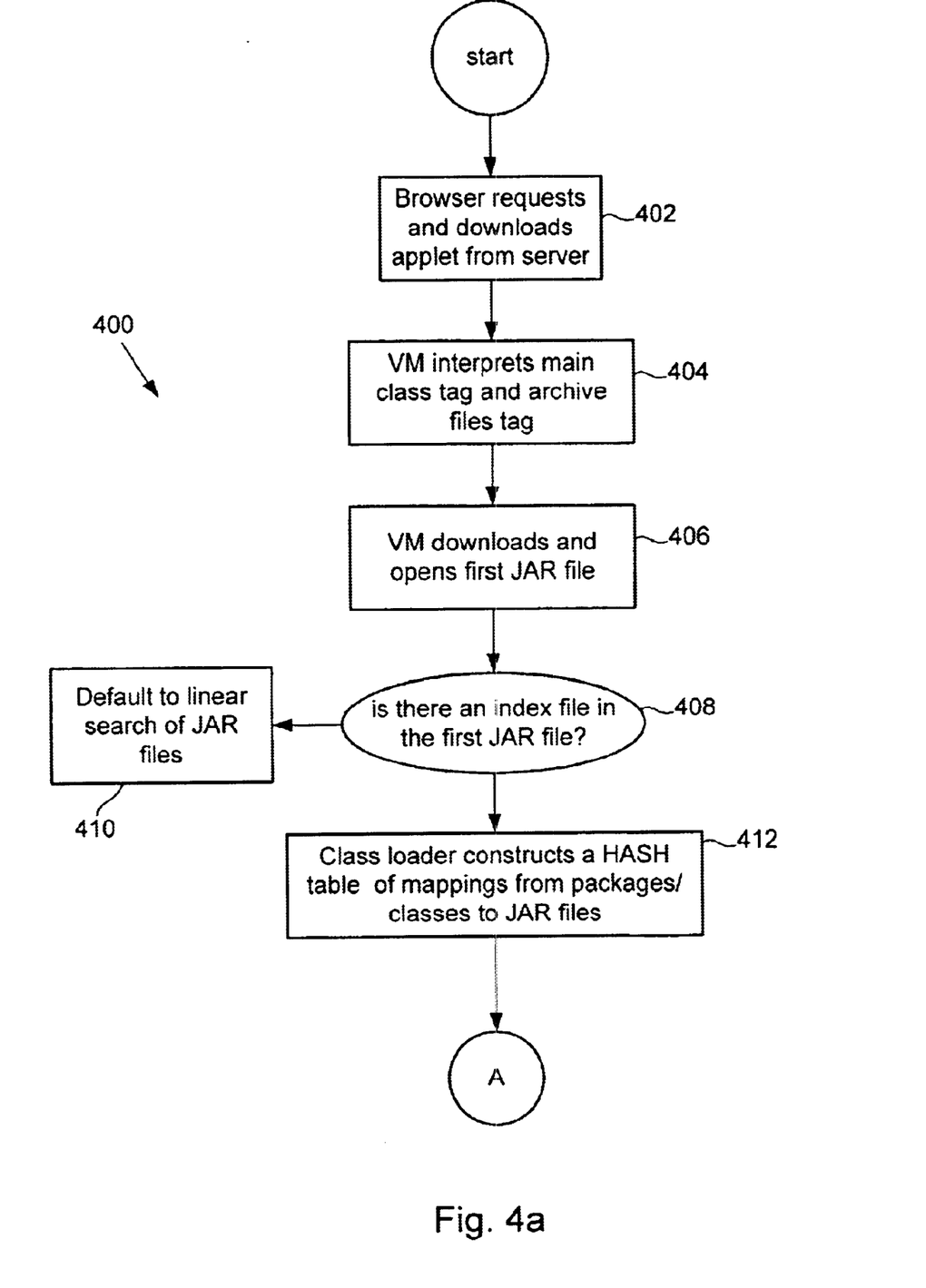
FIGS. 4a–4b is a flowchart detailing a process for a for retrieving and downloading component files by a virtual machine in accordance with an embodiment of the invention.
Figure 4B:
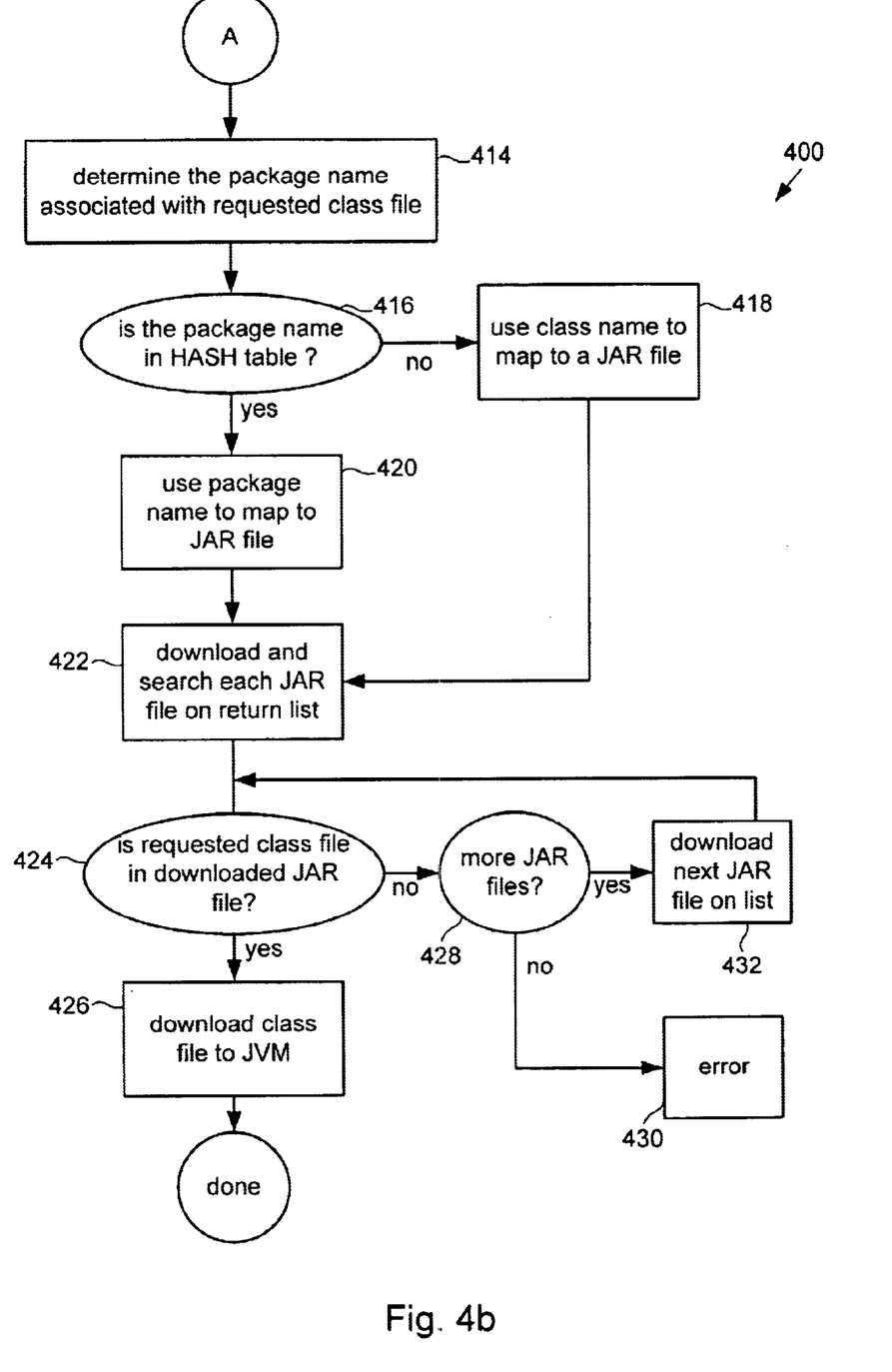

FIGS. 4a and 4b illustrate a flowchart detailing a process 400 for downloading and executing files in a distributed network environment in accordance with one embodiment of the invention. The process 400 begins in FIG. 4a at 402 by the browser resident on a client computer requesting and downloading an applet from a server (host) computer. A JVM resident on the client computer interprets the main class tags and archive file tags corresponding to the downloaded applet at 404. The main class tags and archive file tags provide the JVM with file identifiers subsequently used to identify the various applet component files stored in memory devices coupled to the host computer. At 406, using the main class tags, the JVM downloads and opens the root jar file which may contain the main class files associated with the applet. A determination is then made at 408 whether or not an index file is associated with the root jar file. If it is determined that there is no associated index file, then a default linear search of all JAR files is performed at 410. Otherwise, the class loader in the JVM constructs a HASH table based upon the index file that maps all packages and/or class files not in packages to their respective JAR files at 412.

Turning to FIG. 4b, once the class loader has formed the HASH table, a determination is made at 414 of the package name associated with a requested class file. If, at 416, it is determined that the package name associated with the requested file is not in the HASH table, then the requested file name itself is used to query the HASH table at 418. This particular situation arises when, for example, a single class file is not related to any other class files and is therefore not associated with a particular package. This case is illustrated in FIG. 3 by the $f_{00}$.class file being stored in the JAR file $JAR_2$.

If, however, the package name is found to be included in the HASH table at 416, then the package name is mapped to the associate JAR file(s) using the HASH table at 420. It should be noted that there can be any number of JAR files corresponding to a particular package name and that a particular JAR file can be associated with more than one package name. These cases are aptly illustrated and duly noted in FIG. 3. Once the appropriate JAR file(s) have been identified, the linear search algorithm is used to search the JAR files on the return list which are downloaded one by one and searched for the requested class file at 422. (It should be noted that in some cases the return list could be empty indicating an error) In one embodiment, once the appropriate JAR files are identified on the return list, the first JAR file is downloaded and searched.

If it is determined that the downloaded JAR file contains the requested file at 424, then the requested class file is retrieved and loaded into the JVM at 426. If, however, the requested file is not in the downloaded JAR file, then a determination is made at 428 whether or not there are additional JAR files on the return list. If there are no additional JAR files, then an error has occurred and an error flag is thrown at 430. On the other hand, if there are additional JAR files on the return list, then the next JAR file on the return list is downloaded at 432 and control is passed to 424 to determine whether or not the requested file is present in the next downloaded JAR file.

Figure 5:
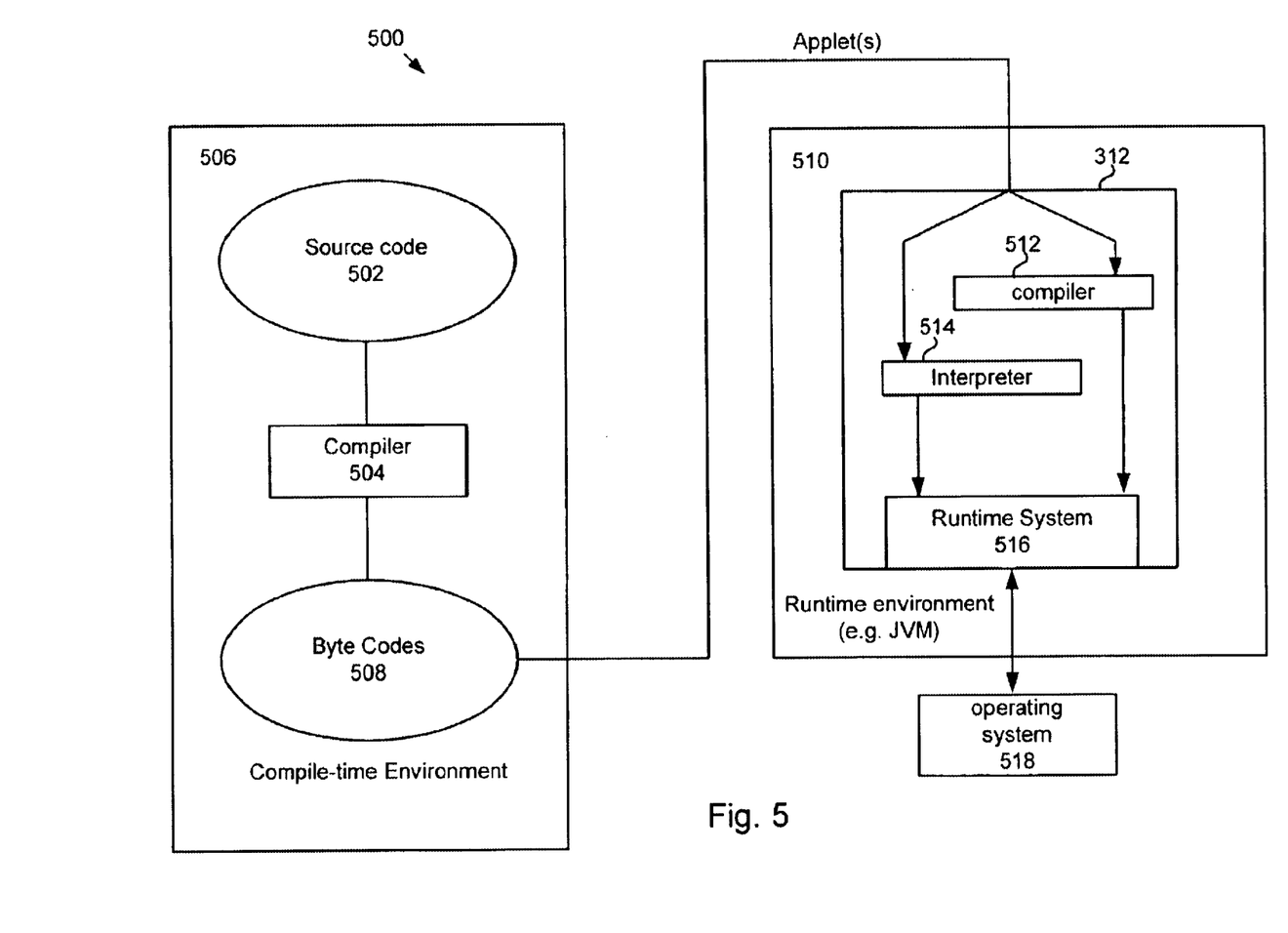
FIG. 5 illustrates an embodiment of a Java virtual machine in accordance with an embodiment of the invention.

FIG. 5 is a block diagram of a virtual machine 500 that is suitable for implementing the present invention. When a computer program, e.g., a computer program written in the Java programming language, is executed, source code 502 is provided to a compiler 504 within compiletime environment 506. Compiler 504 translates source code 502 into bytecodes 508. In general, source code 502 is translated into bytecodes 508 at the time source code 502 is created by a software developer.

Bytecodes 508 may generally be reproduced, downloaded, or otherwise distributed through a network or stored on a storage device. In the described embodiment, bytecodes 508 are platform independent. That is, bytecodes 508 may be executed on substantially any computer system that is running on a suitable virtual machine.

Bytecodes 508 are provided to a runtime environment 510, which includes virtual machine 312. Runtime environment 510 may generally be executed using a processor or processors such as processor 602 described below with reference to FIG. 6. Virtual machine 312 includes a compiler 512, an interpreter 514, and a runtime system 516. Bytecodes 508 may be provided either to compiler 512 or to interpreter 514.

When bytecodes 508 are provided to compiler 512, methods contained in bytecodes 508 are compiled into machine instructions. In one embodiment, compiler 512 is a just-in-time compiler, which delays the compilation of methods contained in bytecodes 508 until the methods are about to be executed. When bytecodes 508 are provided to interpreter 514, bytecodes 508 are read into interpreter 514 one bytecode at a time. Interpreter 514 then performs the operation defined by each bytecode as each bytecode is read into interpreter 514. That is, interpreter 514 "interprets" bytecodes 508, as will be appreciated by those skilled in the art.

When a method is invoked by another method, or is invoked from runtime environment 510, if the method is interpreted, runtime system 516 may obtain the method from runtime environment 510 in the form of sequences of bytecodes 508, which may be directly executed by interpreter 514. If, on the other hand, the method that is invoked is a compiled method that has not been compiled, runtime system 516 also obtains the method from runtime environment 510 in the form of a sequence of bytecodes 508, which then may go to activate compiler 512. Compiler 512 then generates machine instructions from bytecodes 508 and the resulting machine-language instructions may be executed directly by operating system 518. The machine-language instructions are discarded when virtual machine 312 terminates. The operation of virtual machines or, more particularly, Java virtual machines, is described in more detail in *The Java Virtual Machine Specification* by Tim Lindholm and Frank Yellin (ISBN 0-201-63452-X), which is incorporated herein by reference.

Figure 6:
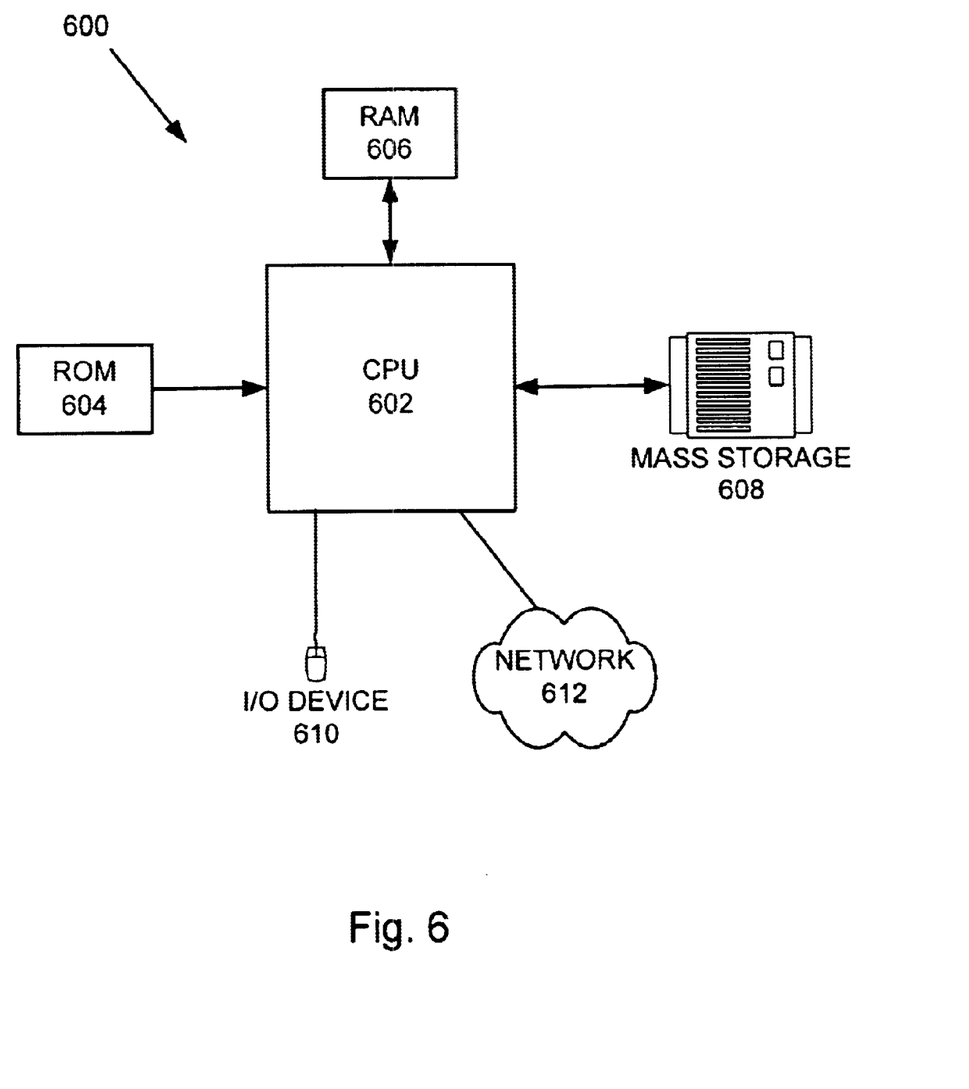
FIG. 6 illustrates a computer system that can be employed to implement the present invention

FIG. 6 illustrates a computer system 600 that can be employed to implement the present invention. The computer system 600 or, more specifically, CPUs 602, may be arranged to support a virtual machine, as will be appreciated by those skilled in the art. As is well known in the art, ROM acts to transfer data and instructions uni-directionally to the CPUs 602, while RAM is used typically to transfer data and instructions in a bidirectional manner. CPUs 602 may generally include any number of processors. Both primary storage devices 604, 606 may include any suitable computer-readable media. A secondary storage medium 608, which is typically a mass memory device, is also coupled bi-directionally to CPUs 602 and provides additional data storage capacity. The mass memory device 608 is a computer-readable medium that may be used to store programs including computer code, data, and the like. Typically, mass memory device 608 is a storage medium such as a hard disk or a tape which generally slower than primary storage devices 604, 606. Mass memory storage device 608 may take the form of a magnetic or paper tape reader or some other well-known device. It will be appreciated that the information retained within the mass memory device 608, may, in appropriate cases, be incorporated in standard fashion as part of RAM 606 as virtual memory. A specific primary storage device 604 such as a CD-ROM may also pass data uni-directionally to the CPUs 602.

CPUs 602 are also coupled to one or more input/output devices 610 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 602 optionally may be coupled to a computer or telecommunications network, e.g., an Internet network or an intranet network, using a network connection as shown generally at 612. With such a network connection, it is contemplated that the CPUs 602 might receive information from the network, or might output information to the network in the course of performing the above-described method steps. Such information, which is often represented as a sequence of instructions to be executed using CPUs 602, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention.

Although the methods of providing efficient file download and execution in a browser environment in accordance with the present invention are particularly suitable for implementation with respect to a Java™ M based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a computer system that has an associated web browser and web server, it should be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. In a client/server environment, a method of executing a particular applet by a virtual machine included in a browser on the client computer, comprising:

requesting a component file package by the virtual machine using a component file package identifier wherein the component file package includes only those applet component files used by the virtual machine to execute the particular applet; and directly downloading only those applet component files from the component file package used by the virtual machine to execute the particular applet thereby substantially reducing bandwidth requirements between the client and server computers in order to execute the applet by the virtual machine.

2. A method as recited in claim 1, wherein the requested file is a Java Archive (JAR) file.

3. A method as recited in claim 2, determining if a root JAR file includes an index file corresponding to the particular applet;

creating a HASH table based upon index file that maps all component file packages and all corresponding JAR files required to execute the applet by the virtual machine; and querying the HASH table in order to directly access the appropriate JAR file that includes the required component files.

4. A method as recited in claim 3, wherein the root file includes a main class file that identifies an entry point for the applet.

5. A method as recited in claim 3, wherein the HASH table is used to identify the location of the main class file.

6. A method as recited in claim 1, wherein the virtual machine substantially simultaneously executes a plurality of applets.

7. A method as recited in claim 6, wherein each of the plurality of applets has an associated root file.

8. A method as recited in claim 7, wherein each of the root files has an associated index file corresponding to the associated applet.

9. A method as recited in claim 8, wherein each of the root files includes a main class file used to identify an entry point for each of the corresponding applets.

10. A method as recited in claim 8, wherein each of the index files is used to create a corresponding HASH table that is used to identify the location of the main class file which in turn provides the corresponding entry point for each of the applets.

11. In a client/server environment, an apparatus for executing a particular applet by a virtual machine included in a browser on the client computer, comprising:

means for requesting a component file package by the virtual machine using a component file package identifier wherein the component file package includes only those applet component files used by the virtual machine to execute the particular applet; and means for directly downloading only those applet component files from the component file package used by the virtual machine to execute the particular applet thereby substantially reducing bandwidth requirements between the client and server computers in order to execute the applet by the virtual machine.

12. An apparatus as recited in claim 11, wherein the virtual machine is part of a browser.

13. An apparatus as recited in claim 11, wherein the virtual machine substantially simultaneously executes a plurality of applets.

14. An apparatus as recited in claim 13, wherein each of the plurality of applets has an associated root file.

15. An apparatus as recited in claim 14, wherein each of the root files has an associated index file corresponding to the associated applet.

16. An apparatus as recited in claim 15, wherein each of the root files includes a main class file used to identify an entry point for each of the corresponding applets.

17. An apparatus as recited in claim 11, further comprising:

means for determining if a root JAR file includes an index file corresponding to the particular applet;

means for creating a HASH table based upon index file that maps all component file packages and all corresponding JAR files required to execute the applet by the virtual machine; and means for querying the HASH table in order to directly access the appropriate JAR file that includes the required component files.

18. An apparatus as recited in claim 17, wherein each of the index files is used to create a corresponding HASH table that is used to identify the location of the main class file which in turn provides the corresponding entry point for each of the applets.

19. In a client/server environment, computer program product for executing a particular applet by a virtual machine included in a browser on the client computer, comprising:

computer program code for requesting a component file package by the virtual machine using a component file package identifier wherein the component file package includes only those applet component files used by the virtual machine to execute the particular applet;

computer program code for directly downloading only those applet component files from the component file package used by the virtual machine to execute the particular applet thereby substantially reducing bandwidth requirements between the client and server computers in order to execute the applet by the virtual machine; and computer readable medium for storing the computer program code.

20. Computer program product as recited in claim 19, computer code for determining if a root JAR file includes an index file corresponding to the particular applet;

computer code for creating a HASH table based upon index file that maps all component file packages and all corresponding JAR files required to execute the applet by the virtual machine; and computer code for querying the HASH table in order to directly access the appropriate JAR file that includes the required component files.

* * * * *